(No Model.)

W. R. DEAN & W. H. BARNETT.
TAG HOLDER.

No. 431,562.  Patented July 8, 1890.

Witnesses
R. A. Balderson
E. E. Todd

Inventor
Wm R Dean
Wm H Barnett
By their Attorneys
Higdon & Higdon

UNITED STATES PATENT OFFICE.

WILLIAM R. DEAN AND WILLIAM H. BARNETT, OF OTTAWA, KANSAS.

TAG-HOLDER.

SPECIFICATION forming part of Letters Patent No. 431,562, dated July 8, 1890.

Application filed March 1, 1890. Serial No. 342,188. (No model.)

*To all whom it may concern:*

Be it known that we, WILLIAM R. DEAN and WILLIAM H. BARNETT, of Ottawa, Franklin county, Kansas, have invented certain new and useful Improvements in Tag-Holders, of which the following is a full, clear, and exact description, reference being had to the accompanying drawings, forming a part hereof.

Our invention relates to improvements in tag-holders, its object being to provide a tag-holder which may easily be secured in position when used for marking dry goods or to designate initial letters or numbers to be used on the front of desks, &c., its further object being to provide a tag-holder which will be inexpensive, and may be secured in position by any one desiring to use them by using the pliers or fasteners.

Figure 1:
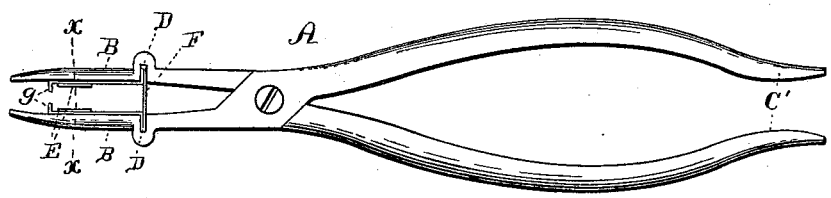
Figure 2:
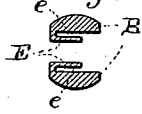
Figures 3, 4:
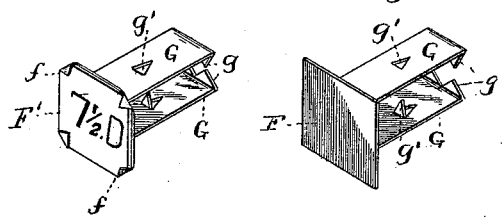
Figure 5:
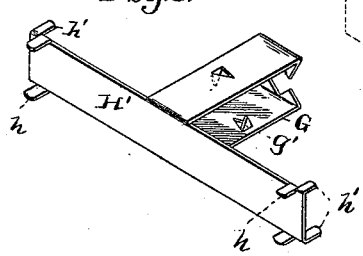
Figure 6:
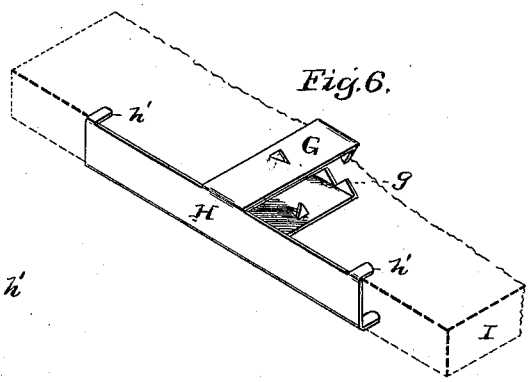

In the drawings which illustrate the manner of carrying out our invention, Figure 1 is a front view of our improved tag-fastener, showing the tag-holder in position. Fig. 2 is a sectional view taken on line $x$ $x$ of Fig. 1. Fig. 3 is a detail in perspective of the tag-holder, showing the manner of constructing it when the tag is to be composed of a separate piece. Fig. 4 is a detail in perspective of the same, showing the manner of construction when the characters are to be printed on the plate. Fig. 5 is a detail in perspective of the device used for dry goods, &c., showing the lugs which receive and hold the tag; and Fig. 6 is a detail in perspective of the same, showing the board to which it is secured in dotted lines.

Referring to the drawings by letter, A represents our tag-fastener having the jaws B and handles C′ constructed substantially as shown.

D is a circular projection on each of the jaws B, which form a slot to receive the tag F. E are extensions or flanges formed into each of the jaws near the end, in which the extensions G of the tag-holder rest.

F are the tag-holders, heretofore referred to, which may be constructed as shown in Figs. 3 and 4. The device shown in Fig. 3 consists of a main plate F, of tin or other suitable material, having its corners $f$ bent over to receive and hold the card-board or other device which may have the necessary initials, numbers, or marks printed thereon. Secured to this plate F are two extensions G, having their outer ends $g$ formed in the shape of teeth and bent inwardly, as shown. These extensions G are also provided with teeth $g'$, cut in their sides near the center, as shown in Figs. 3 and 4, and when they are slipped over the board or desk where they are to be used and forced together within the fastener A the teeth $g$ and $g'$ enter the wood and hold said tag-holder rigid. The tag illustrated in Fig. 4 is made substantially as that shown in Fig. 3, except that the corners are not bent over, and the letters and numbers are painted or printed on the plate instead of being printed on a slip of card-board.

H shows the tag-fastener made longer. This device is designed to be used for marking rolls of dry goods or for printing names, &c., which are to be secured on desks, &c. The lugs $h$, which extend from this device, are to receive the strip of card-board on which the names are written or printed. These lugs can be bent upward and downward, so as to receive the card-board and hold it tightly. The lugs $h'$ are to fit over the edges of the board I, and are for the purpose of keeping the device steady and prevent it from twisting around.

To use our device, the tag-fastener A is taken in the hand in the same manner as one would grasp a pair of pliers, the tag-holder inserted in it by slipping the head F through the slot D, allowing the extension G to rest in the slots $e$ formed by the flanges E. The fastener A is then opened and the device passed over the edge of the board or desk to which the tag is to be secured. The handles C are then pressed together, thereby firmly embedding the teeth $g$ and $g'$ in said desk or board. By a slight side movement of the fastener A said fastener can be removed from the tag, leaving it in place.

The fastener A will form the subject-matter of another application for Letters Patent.

Having thus fully described our invention, what we claim as new, and desire to secure by Letters Patent, is—

In a tag-holder, the card-receiving portion, the rearwardly and forwardly extending lugs $h$ and $h'$ secured thereon, rearwardly-extending plates G G, having struck-up serrated edges, and the teeth $g'$ in the center of said plates, substantially as described.

In testimony whereof we affix our signatures in presence of two witnesses.

WILLIAM R. DEAN.
WILLIAM H. BARNETT.

Witnesses:
C. E. LATCHEM,
W. A. CURL.